US009189316B2

(12) United States Patent
Butterworth (10) Patent No.: US 9,189,316 B2
(45) Date of Patent: Nov. 17, 2015

(54) MANAGING FAILOVER IN CLUSTERED SYSTEMS, AFTER DETERMINING THAT A NODE HAS AUTHORITY TO MAKE A DECISION ON BEHALF OF A SUB-CLUSTER

(71) Applicant: International Business Machines Corporation, Armonk, NY (US)

(72) Inventor: Henry Esmond Butterworth, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/780,031

(22) Filed: Feb. 28, 2013

(65) Prior Publication Data

US 2013/0227359 A1    Aug. 29, 2013

(30) Foreign Application Priority Data

Feb. 28, 2012  (CN) .......................... 2012 1 0047999

(51) Int. Cl.
*G06F 11/20* (2006.01)
*G06F 11/07* (2006.01)
*G06F 11/14* (2006.01)

(52) U.S. Cl.
CPC ........ *G06F 11/0772* (2013.01); *G06F 11/0709* (2013.01); *G06F 11/2025* (2013.01); *G06F 11/2028* (2013.01); *G06F 11/0757* (2013.01); *G06F 11/1482* (2013.01); *G06F 11/2035* (2013.01)

(58) Field of Classification Search
CPC . G06F 11/20; G06F 11/2002; G06F 11/2038; G06F 11/2041; G06F 11/2046; G06F 11/2023; G06F 11/2025; G06F 11/202
See application file for complete search history.

(56) References Cited

U.S. PATENT DOCUMENTS

| 6,442,713 | B1* | 8/2002 | Block et al. ................... 714/43 |
| 7,457,236 | B2 | 11/2008 | Cheng et al. |
| 7,631,066 | B1 | 12/2009 | Schatz et al. |
| 7,676,687 | B2 | 3/2010 | Gunda et al. |
| 7,739,541 | B1 | 6/2010 | Rao et al. |
| 7,843,811 | B2 | 11/2010 | Armstrong et al. |
| 2002/0095489 | A1 | 7/2002 | Yamagami |
| 2003/0088676 | A1* | 5/2003 | Smith et al. ................... 709/227 |
| 2004/0139196 | A1* | 7/2004 | Butler et al. ................... 709/225 |
| 2005/0060426 | A1 | 3/2005 | Samuels et al. |
| 2005/0246568 | A1* | 11/2005 | Davies ............................. 714/2 |

(Continued)

FOREIGN PATENT DOCUMENTS

| CN | 1508714 A | 8/2006 |
| CN | 1812341A A | 8/2006 |

(Continued)

OTHER PUBLICATIONS

Sun(tm) Cluster 3 Architecture: A Technical Overview, available from Sun Microsystems, Inc., Palo Alto, CA, copyright 2000.

(Continued)

*Primary Examiner* — Joseph Schell
(74) *Attorney, Agent, or Firm* — Feb Cabrasawan (57) ABSTRACT

Failover in a clustered system is managed. The clustered system includes sub-clusters connected with one another by a first set of links. Each sub-cluster includes nodes connected with one another by a second set of links. At least one of the second set of links is used to determine that a suspect node within a same sub-cluster has stopped. In response, a lease relinquish message is transmitted on behalf of the suspect node.

18 Claims, 3 Drawing Sheets

(56) References Cited

U.S. PATENT DOCUMENTS

| | | | |
|---|---|---|---|
| 2005/0283641 A1* | 12/2005 | Clark et al. | 714/4 |
| 2006/0168256 A1* | 7/2006 | Fuente et al. | 709/229 |
| 2006/0187906 A1* | 8/2006 | Bedi et al. | 370/352 |
| 2008/0250267 A1* | 10/2008 | Brown et al. | 714/4 |

FOREIGN PATENT DOCUMENTS

| | | |
|---|---|---|
| CN | 101458808 A | 6/2009 |
| CN | 101617295 A | 12/2009 |
| CN | 102035862 A | 4/2011 |

OTHER PUBLICATIONS

"Method and system for supporting node fencing in a cluster infrastructure," IP.com, IPCOM000197615D (IP.com number), Jul. 16, 2010.

Office action dated Sep. 6, 2015 for Chinese counterpart application No. 201210047999.6, 10 pp.

* cited by examiner

MANAGING FAILOVER IN CLUSTERED SYSTEMS, AFTER DETERMINING THAT A NODE HAS AUTHORITY TO MAKE A DECISION ON BEHALF OF A SUB-CLUSTER

RELATED APPLICATIONS

The present patent application claims priority under 35 USC 119 to the previously filed Chinese patent application, filed on Feb. 28, 2012, and assigned CN patent application number 201210047999.6.

BACKGROUND

The development of information technology provides increasingly rich and powerful applications and services, and at the same time brings forward increasing demands on the computing capacity and storage capability of processing equipment. Therefore, clustered systems can be employed to store and process an immense amount of information and data and to provide services to the clients with high availability. A clustered system includes a group of computing devices that are linked by hardware and software and thus operate together to provide services as a single system image. Such computing devices are referred to as nodes in the cluster.

SUMMARY

An example apparatus of the disclosure is for managing failover in a clustered system. The clustered system includes sub-clusters connected with one another by a first set of links. Each sub-cluster includes nodes connected with one another by a second set of links The apparatus includes a determination unit configured to determine, by using at least one of the second set of links, that a suspect node within a same sub-cluster has stopped. The apparatus includes a notification unit configured to, in response to the determination, transmit a lease relinquish message on behalf of the suspect node.

An example node of the disclosure is in a clustered system. The clustered system includes sub-clusters connected with one another by a first set of links. Each sub-cluster includes nodes connected with one another by a second set of links. The node includes a determination unit configured to determine, by using at least one of the second set of links, that a suspect node within a same sub-cluster has stopped. The node includes a notification unit configured to, in response to the determination, transmit a lease relinquish message on behalf of the suspect node.

An example clustered system of the disclosure includes sub-clusters connected with one another by a first set of links. Each sub-cluster includes nodes connected with one another by a second set of links. At least one node includes a determination unit configured to determine, by using at least one of the second set of links, that a suspect node within a same sub-cluster has stopped; and a notification unit configured to, in response to the determination, transmit a lease relinquish message on behalf of the suspect node.

An example method of the disclosure for managing failover in a clustered system. The clustered system includes sub-clusters connected with one another by a first set of links. Each sub-cluster includes nodes connected with one another by a second set of links The method includes determining, by using at least one of the second set of links, that a suspect node within a same sub-cluster has stopped. The method includes transmitting, in response to the determination, a lease relinquish message on behalf of the suspect node.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure. In the detailed description, like numbered elements in the figures are either similar elements or perform an equivalent function. Elements that have been discussed previously will not necessarily be discussed in later figures if the function is equivalent.

As described in the background section, cluster systems are advantageous. With most clustered systems, in order to keep the single system image, it is necessary to prevent a cluster from splitting into multiple independent systems due to failures of nodes or inter-node communication infrastructure. That is to say, if a node is disconnected from the main cluster and thus unable to keep up-to-date with the single system image, it is necessary to first make sure this node stops serving client requests, and then allow the main cluster to make progress so as to re-distribute the work performed by the disconnected node to the surviving members of the cluster. This requirement of stopping disconnected nodes before allowing the main cluster to proceed means that the time taken to stop disconnected nodes is a lower bound on the time services provided by the main cluster will be unavailable during recovery from a failed or disconnected node. Therefore, to create a highly available fault tolerant clustered system, it is critical to minimize the time taken to stop disconnected nodes so that the main cluster may proceed as quickly as possible to restore availability after the failure of the node or inter-node connection.

There are several conventional approaches to stop the failed node and ensure the cluster continues operating as a single system image. Lease-based mechanisms are one approach. A lease permits a node to offer a service on behalf of the cluster. The lease-based mechanism uses messages between cluster nodes to grant leases so as to define the time-limited period during which the node is allowed to operate on behalf of the cluster. In the event of loss of communication, the node that is disconnected from the cluster can no longer receive the lease refresh messages and voluntarily stops cluster services when its lease expires. The main cluster waits for a period of time not less than the lease (usually a lease period plus some extra time to account for clock drift) before being assured that the disconnected node has stopped and allowing the transfer of work from the failing nodes to surviving nodes within the cluster.

The lease time defines the minimum period during which a service is unavailable following a failure. The shorter the lease time used by the cluster the faster the failover time. However, at the same time, the shorter the lease time, the more frequently nodes within the cluster need to extend the lease and consequently the greater the overheads are for maintaining the lease. That is to say, the lease-based mechanism has conflicting requirement placed on the lease time: first it is necessary for the lease time to be short to allow the cluster to recover quickly and second it is necessary for it to be long enough to reduce the frequency of the lease refresh messages and prevent spurious lease expiries when cluster nodes are heavily loaded. The conflicting requirement on the lease time means that it is difficult to achieve quick recovery of cluster service with lease based mechanisms.

To facilitate quick recovery of the cluster service, lease based mechanisms have been improved. In one type of improved mechanism, a node which knows that it is about to fail or become disconnected can voluntarily give up the lease by sending a lease relinquish message to another node in the cluster. This message allows the cluster to know that the failing node has already stopped without waiting for the lease period and so the main cluster can restore availability quickly. This is a useful enhancement to the conventional lease based mechanisms but it only works in the case where a node may notice it is about to fail and is well enough to send the relinquish message. In many cases where nodes fail or become disconnected suddenly, it is still necessary for the main cluster to wait for at least the full lease period in order to ensure the lease has expired. Therefore, the improved mechanism has limited application.

Another approach to stop the failed node includes STONITH-like mechanisms. STONITH is an acronym for shoot-the-other-node-in-the-head, and describes mechanisms where surviving cluster nodes directly force the suspect node to stop by using a hardware mechanism. With STONITH-like mechanisms, the time taken to stop disconnected nodes can easily be made very short to allow the cluster to recover quickly. However, STONITH-like mechanisms require a surviving communication path during their critical period of operation, which is not suitable for clustered systems involving remote node communication.

Disclosed herein are techniques to efficiently manage the connection and failover of the nodes so as to provide a highly available clustered system that overcome the above-identified and other shortcomings of conventional techniques. Within the disclosed techniques, a cluster can quickly make sure the disconnected node has stopped, and thus restore its service as soon as possible. Therefore, the failover time is shortened, and the availability of the clustered system is improved.

Figure 1:
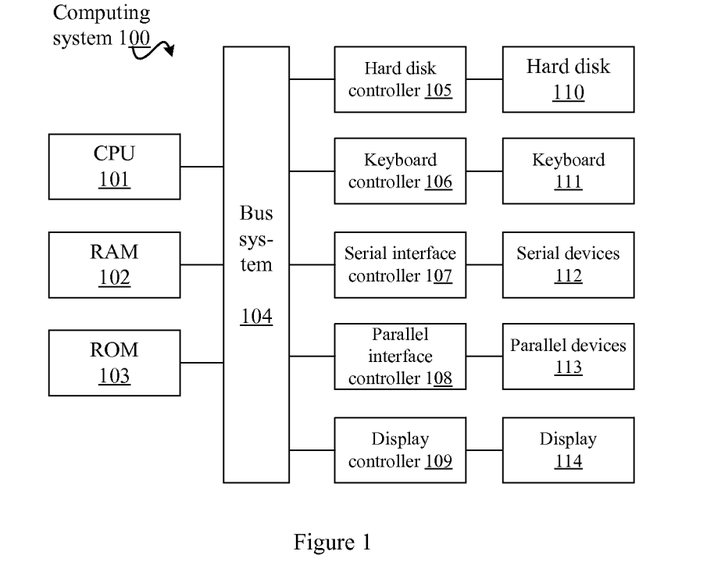
FIG. 1 is a diagram of an example computer system.

FIG. 1 shows an example computer system 100 that is applicable to implement the techniques disclosed herein. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose. In some cases, some devices may be added to or removed from the computer system 100 based on specific situations.

Figure 2:
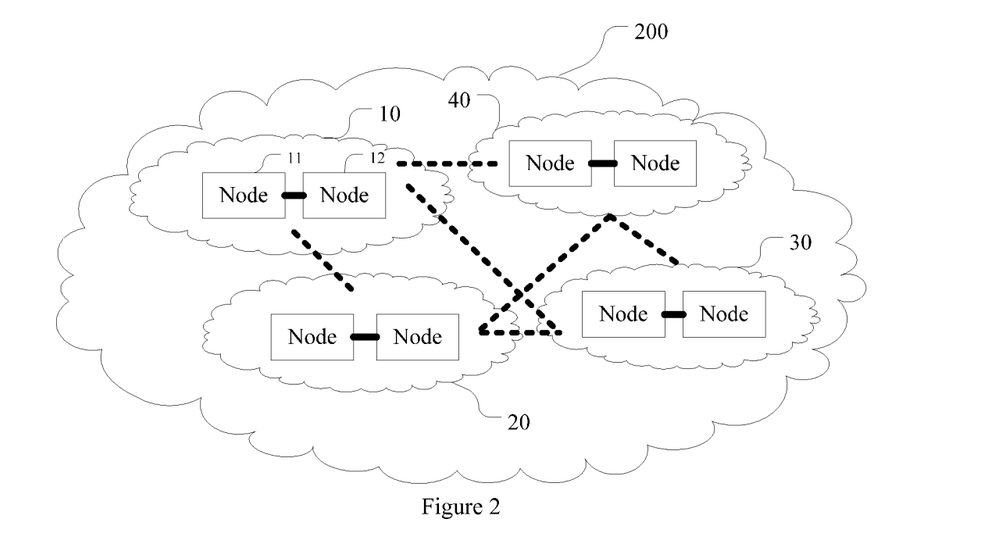
FIG. 2 is a diagram of the structure of an example clustered system.

With reference now to FIG. 2, the structure of an example clustered system is described. As shown in the figure, a clustered system 200 includes multiple sub-clusters, in the example of FIG. 2, shown as sub-clusters 10-40. Each of the sub-clusters 10-40 includes a nodes connected with one another. For example, sub-cluster 10 includes node 11 and node 12. The nodes in the clustered system may be any kind of computing device, such as individual computers, controllers and storage device. The connection in the clustered system can be categorized as a first set of links (shown as dash lines) used for the interconnection among sub-clusters and a second set of links (shown as solid lines) used for interconnection among nodes within one sub-cluster.

The first set of links may be any kind of link suitable for node connection. In one implementation, the first set of links includes loosely coupled links, which are usually suitable for remote communication. For example, the first set of links may be fiber channel links and switches used to connect remote nodes in the cluster. The second set of links may be any kind of link more tightly coupled than the first set of links, and usually includes multiple independent hardware communication paths between nodes. In one implementation, the second set of links includes tightly coupled links. For example, the second links may include PCI or PCIe buses used for communication between nodes over a short distance.

In one implementation, nodes in one sub-cluster are enclosed in an enclosure. In such case, the second set of links are tightly coupled links internal to the enclosure and ordinarily not subject to disconnection by user, while the first set of links are external cables which are exposed to manual intervention. In one implementation, the second set of links may additionally include loosely coupled interconnection or share use of the first set of links to improve the reliability of the communication within a sub-cluster. Other various specific connection manners can be employed besides the above-described examples according to actual need.

Figure 3:
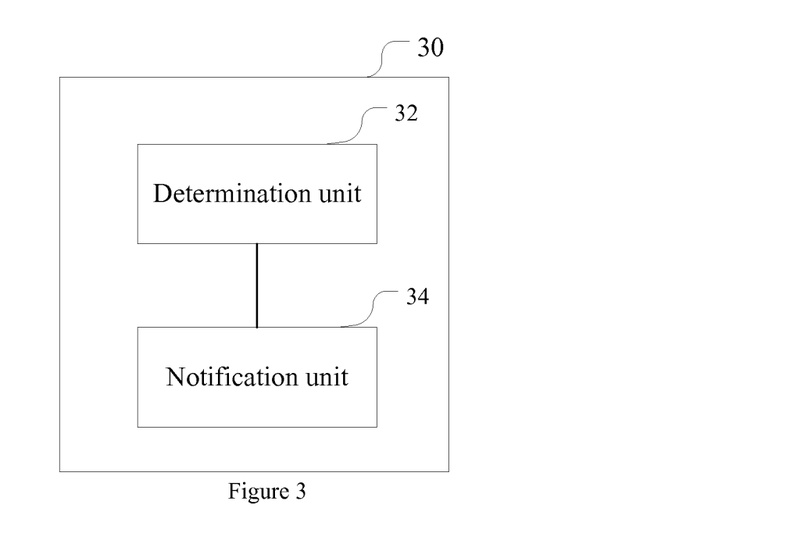
FIG. 3 is a diagram of an example apparatus for failover management.

FIG. 3 shows an example apparatus for failover management. The apparatus 30 of FIG. 3 can be used at any or each node in the clustered system of FIG. 2, or used at other proper location in the cluster system. As shown in FIG. 3, the apparatus 30 includes a determination unit 32 configured to determine, by using at least one of the second set of links, that a suspect node within a same sub-cluster has stopped; and a notification unit 34 configured to, in response to the determination, transmit a lease relinquish message on behalf of the suspect node.

Figure 4:
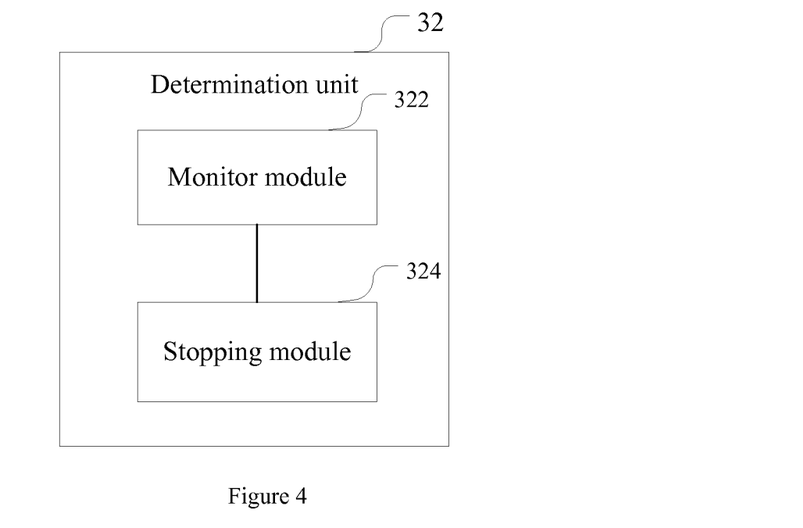
FIG. 4 is a diagram of an example determination unit.

To implement above determination process, the determination unit 32 in one implementation may include further sub-units or modules, as shown in FIG. 4. With reference to FIG. 4, the determination unit 32 may include a monitor module 322 and a stopping module 324. The monitor module 322 is configured to monitor nodes within the same sub-cluster so as to detect or find out the suspect node. The stopping module 324 is configured to ensure the detected suspect node has stopped.

Figure 5:
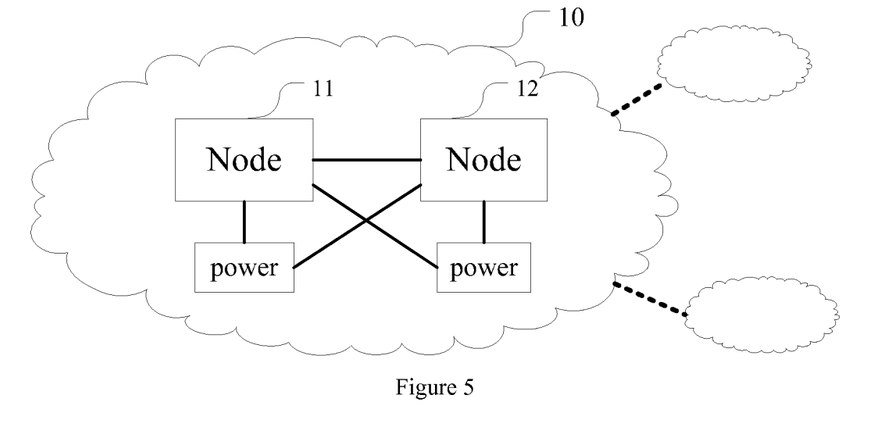
FIG. 5 is a diagram of an example sub-cluster.

Next, the specific implementation of the units and modules of apparatus 30 is described in connection with the example of FIG. 5 in which both of node 11 and node 12 in the sub-cluster 10 of FIG. 1 incorporates the above apparatus 30. Specifically, in one implementation, the monitor module 322 may monitor the status of nodes within the same sub-cluster using heartbeat messages. Heartbeat messages are used in clustered system as routine communication. Usually, each node may broadcast its heartbeat message periodically to other nodes to report its health status. In the example of FIG. 5, node 11 and node 12 may send its heartbeat message to each other to indicate it is alive. Accordingly, each node monitors the heartbeat message from the other using the monitor module 322. In a simple implementation, if failing to hear the heartbeat from another node in a certain interval, e.g. heartbeat period plus extra delay, the monitor module 322 may deem that node as suspect node that should be stopped.

In another implementation, the monitor module 322 takes more practical consideration into account before determining the suspect node. For example, during software upgrade it might be necessary for a node to reboot in which case it might fail to generate heartbeat messages for longer than the predefined worst-case delay time. In this case, the monitor module 322 may extend the timeouts across software upgrade to allow the node enough time to come back and start generating heartbeats again. Such consideration and measurement are appropriate when implementing STONITH mechanism. Therefore, the monitor module 322 may use the judging algorithm of any STONITH technique. In one implementation, the monitor module 322 may be based on or reuse the monitoring module of STONITH mechanism. However, algorithms other than that of STONITH mechanism can be employed to declare a suspect node when it is failed or disconnected from the cluster.

For better illustration, it is assumed that in the example shown in FIG. 5, the monitor module 322 in node 11 has declared node 12 as suspect node. In response to the declaration, the corresponding stopping module 324, i.e. the stopping module in node 11, makes sure that the suspect node 12 has stopped.

In one implementation, the stopping module 324 forces node 12 to stop by using at least one of the second set of links between node 11 and node 12. As noted above, the second set of links may include multiple independent hardware communication paths between nodes. Therefore, even though node 12 is supposed to be disconnected, there may still be a surviving communication path between the nodes so that the stopping module 324 in node 11 may communicate with node 12. In one example, the stopping module 324 may directly turn off the power supply of node 12 through software program using the link connecting node 11 with the power supply of node 12, so that it can be ensured that the suspect node 12 has stopped. Such stopping manner is similar with that in STONITH mechanism. Therefore, in one implementation, the stopping module 324 may be based on or reuse the stopping module of prior art STONITH tool. However, methods other than that of STONITH mechanism may be employed to stop a suspect node.

In another implementation, the stopping module 324 does not perform an actual stopping operation on the suspect node, and instead, it uses the second set of links to detect when a suspect node within the sub-cluster is very likely to have stopped. That is to say, the stopping module in this implementation cannot know for sure that node 12 has stopped but it can detect and tell the time when it is overwhelmingly likely that node 12 has stopped. For example, since there are multiple redundant tightly coupled links between node 11 and node 12 in the same sub-cluster, it is impossible to break all of them unless all the connections fail simultaneously or node 12 has stopped. Multiple independent simultaneous hardware failures would be so unlikely it can be ignored, and then it is overwhelmingly likely that the suspect node 12 is stopped. In this case, the stopping module 324 needs to wait for the worst-case possible delay in responding to a heartbeat on all logical communication links constituting the redundant paths before declaring node 12 to be dead. The stopping module 324 in this implementation may be simpler and more appropriate in some circumstances.

Through the above monitor module 322 and stopping module 324, the determination unit 32 may determine that a suspect node within the same sub-cluster has stopped. In response to the determination, the notification unit 34 may transmit a voluntary lease relinquish message on behalf of the suspect node, so that the global main cluster is given a guarantee that the suspect node has stopped. Specifically, as noted above, existing clustered systems use lease to allow the nodes to offer service on behalf of the cluster. Accordingly, each node contains a lease management unit to maintain the lease.

In the clustered system of FIG. 2, the lease management units in the nodes collaborate with their peers across the entire cluster to perform a global lease based mechanism by communicating the lease over available inter-node links in the global cluster. Instead of sending the lease relinquish message by the failing node in the improved lease based mechanism, in one implementation, the notification unit 34 in the surviving node transmit the lease relinquish message on behalf of the failing node. In order to send message on behalf of other node, in one implementation, the notification unit 34 modifies the lease relinquish message to include the identification information of the suspect node. In one example, the identification information of the suspect node should be a cluster-wide unique identifier, such as the media-access controller (MAC) address of the suspect node.

To make the main cluster aware of the lease relinquishment, the lease relinquish message, including the identification information of the suspect node, can be sent to a managing component that manages the lease of the global cluster. The managing component may be resident on any node in the cluster. Therefore, generally, the lease relinquish message will be sent out of the sub-cluster that detected the problem. But when the global lease managing component happens to reside in the sub-cluster including the suspect node, the lease relinquish message will be sent within the sub-cluster.

In an even more special case where the managing component resides in the node who detects the failure of the suspect node, the relinquish message could be a message between components of the software running on that node. In practice, such kinds of messages are usually communicated in abstraction layer, which routes messages from sender to receiver without either having to know exactly how the message was routed. So the three cases would look the same to the sender and receiver and the message routing layer of software would work out whether the message needed to be sent outside the sub-cluster, within the sub-cluster or was a message for the local node, and which links shall be used. In general, once the global lease managing component receives the lease relinquish message sent on behalf of the suspect node, the global main cluster may make use of the information that the suspect node has stopped.

With reference to FIG. 5 again, in case node 12 is determined as stopped by the determination unit 32 of node 11, the notification unit 34 of node 11 sends a lease relinquish message on behalf of node 12 to a node including the global lease managing component. The lease relinquish message may be further communicated in the cluster through the first link (and optionally the second link when communicated within a sub-cluster), so that the global main cluster may be given a guarantee that the suspect node 12 has already stopped. After obtaining the guarantee, the main cluster may proceed to re-distribute the work and continue to offer service to the clients.

The above implementations have been described with reference to the system of FIG. 2 and FIG. 5 in which each sub-cluster include two nodes. However, this is not necessary and other implementations are not so limited. In can be understood that the clustered system may include any number of sub-cluster and each sub-cluster may include any number of nodes. Furthermore, different sub-clusters may include different number of nodes. Accordingly, the failover management apparatus 30 can be equally applied to various cluster modifications and situations, as described below.

In one example, a sub-cluster includes three nodes A, B and C, and each two of the three nodes is connected by one or more links in the second set of links More nodes may have more logical communication paths among them and more heartbeats would be used and run on each of the logical communication paths. Using such heartbeats, the monitor module 322 may similarly detect the suspect node. For example, if failing to obtain heartbeat message from node C, both of the monitor modules in nodes A and B can deem node C as suspect node. Then, either or all of nodes A and B may directly stop node C or declare that node C is very likely to be stopped by using their stopping modules 324 based on STONITH like mechanism.

In one implementation, the notification unit 34 is configured to transmit the lease relinquish message once the corresponding determination unit 32 declares the stop of the suspect node. In such case, each of node A and node B may send the lease relinquish message on behalf of node C using its notification unit 34. In another implementation, the clustered system may set a leader node in each sub-cluster in advance, or each node in the sub-cluster is given an authority level. Such authority information relating to the leader node or authority levels may be accessed by each node in the sub-cluster. Accordingly, the apparatus 30 may further include a judging unit to check whether the node has sufficient authority to make decision on behalf of the sub-cluster, in particular, to send the relinquish message on behalf of the stopped node, by accessing and inquiring the authority information.

At the same time, the notification unit 34 may be configured to transmit the lease relinquish message in response to the judging that the node has certain authority. As a result, only the notification unit 34 of the leader node or nodes with certain authority will transmit the lease relinquish messages on behalf of the suspect node C. Therefore, the main cluster outside this sub-cluster can similarly make sure that the suspect node C has stopped. By using the authority management mechanism, those skilled in the art can easily extend the three node example to four or more nodes. Therefore, the apparatus 30 can be applied to nodes in any sub-cluster structure.

As such, the above-described apparatus 30 can efficiently manage the failover for a cluster with hybrid inter-node connections that is the common case in recent developed clustered system. By modifying and improving the STONITH mechanism and lease-based mechanism, the apparatus 30 can combine the advantages of the two mechanisms together to facilitate the failover and recovery of the system. First, by using the tightly coupled link between nodes inside a sub-cluster, the apparatus 30 makes the sub-cluster quickly stop the suspect node using a manner similar with STONITH mechanism. After it is determined the suspect node has stopped, the apparatus 30 makes the sub-cluster to send a lease relinquish message on behalf of the stopped node so that the global cluster may obtain the guarantee that the suspect has stopped. Therefore, even if a disconnected node fails suddenly and is thus unable to voluntarily give up a lease, the main cluster may be notified by the lease relinquish message on behalf of the failed node sent from the sub-cluster, and does not have to wait for the full lease period.

Figure 6:
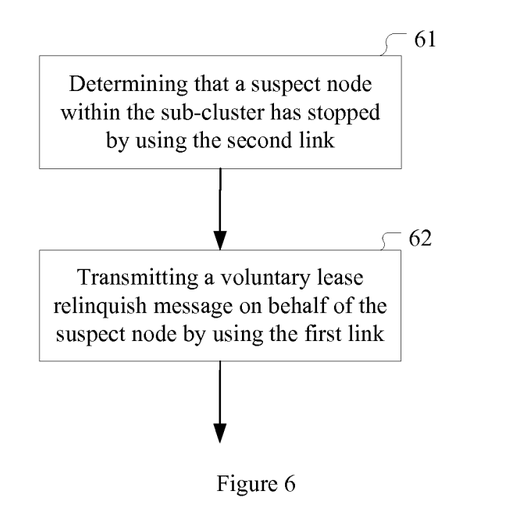
FIG. 6 is a flowchart of an example method.

The techniques disclosed herein also provide a method for managing failover used at a node in a clustered system, where the clustered system includes a number of sub-clusters connected with one another by a first set of links, each sub-cluster including a number of nodes connected with one another by a second set of links, and the second set of links including tightly coupled link. FIG. 6 shows such an example method according to one implementation. As shown in FIG. 6, the method includes step 61 of determining that a suspect node within the same sub-cluster has stopped by using the second set of links, and step 62 of transmitting, in response to the determination, a voluntary lease relinquish message on behalf of the suspect node.

In one implementation, the determination step 61 further includes the following sub-steps: monitoring nodes within the same sub-cluster so as to detect a suspect node, and ensuring the suspect node has stopped. The monitoring of node status can be performed by using heartbeat messages. In one example, the process directly forces the suspect node to stop by using at least one of the second set of links. In another example, the process does not perform an actual stopping operation on the suspect node; instead, it uses the second set of links to detect when the suspect node is very likely to have stopped, and then it declares the stop of the suspect node.

In one implementation, in step 61, the process modifies the lease relinquish message to include the identification information of the suspect node. Then, the lease relinquish message including the identification information of the suspect node can be sent to any node managing the global lease of the cluster, so that the global main cluster may make use of the information that the suspect node has stopped. In one implementation, the method further includes a judging step to check whether the node has authority to make decision on behalf of the sub-cluster by accessing and inquiring the authority information. This step can make sure the lease relinquish message is sent from a leader node, instead of from all surviving nodes simultaneously.

The principle and mode of implementation for the above method correspond to the description of the apparatus shown in FIG. 3 and FIG. 4 hereinbefore that has been provided above. Using the apparatus and the method according to the techniques that have been described above, the sub-cluster can stop the disconnected node immediately, and then the main cluster can make use of the information that the disconnected node has stopped, and restore its service quickly, so as to improve the availability of the clustered system.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. An apparatus for managing failover in a clustered system, the clustered system comprising a plurality of sub-clusters connected with one another by a first set of links, each sub-cluster comprising a plurality of nodes connected with one another by a second set of links, the apparatus comprising:

a processor;

a non-transitory computer-readable medium storing computer-executable code that when executed by the processor implements a plurality of units comprising:
 a determination unit configured to determine, by using at least one of the second set of links, that a suspect node within a same sub-cluster as another node has stopped;
 a notification unit configured to, in response to the determination, transmit a lease relinquish message on behalf of the suspect node; and
 a judging unit configured to check whether the another node has authority to make a decision on behalf of the same sub-cluster by accessing and inquiring about authority information,
 wherein the notification unit is configured to transmit the lease relinquish message in response to the judging unit determining that the another node has authority.

2. The apparatus according to claim 1, wherein the determination unit further comprises:
 a monitor module configured to monitor nodes within the same sub-cluster so as to detect the suspect node; and
 a stopping module configured to ensure the detected suspect node has stopped.

3. The apparatus according to claim 2, wherein the monitor module is configured to monitor nodes using heartbeat messages.

4. The apparatus according to claim 2, wherein the stopping module is configured to force the suspect node to stop by using one or more of the second set of links.

5. The apparatus according to claim 4, wherein the second set of links comprises tightly coupled links, and the stopping module is configured to directly turn off a power supply of the suspect node using the tightly coupled links.

6. The apparatus according to claim 2, wherein the stopping module is configured to use the second set of links to detect a time when the suspect node is very likely to have stopped.

7. The apparatus according to claim 1, wherein the notification unit is configured to include identification information of the suspect node in the lease relinquish message.

8. The apparatus according to claim 1, wherein the notification unit is configured to transmit the lease relinquish message to a managing component which manages a lease of a global cluster.

9. A node in a clustered system, the clustered system comprising a plurality of sub-clusters connected with one another by a first set of links, each sub-cluster comprising a plurality of nodes connected with one another by a second set of links, the node comprising:
 a determination unit configured to determine, by using at least one of the second set of links, that a suspect node within a same sub-cluster as the node has stopped;
 a notification unit configured to, in response to the determination, transmit a lease relinquish message on behalf of the suspect node; and
 a judging unit configured to check whether the node has authority to make a decision on behalf of the same sub-cluster by accessing and inquiring about authority information,
 wherein the notification unit is configured to transmit the lease relinquish message in response to the judging unit determining that the node has authority.

10. A clustered system comprising a plurality of sub-clusters connected with one another by a first set of links, each sub-cluster comprising a plurality of nodes connected with one another by a second set of links, at least one of the plurality of nodes comprising:
 a determination unit configured to determine, by using at least one of the second set of links, that a suspect node within a same sub-cluster as the at least one of the plurality of nodes has stopped;
 a notification unit configured to, in response to the determination, transmit a lease relinquish message on behalf of the suspect node; and
 a judging unit configured to check whether the at least one of the plurality of nodes node has authority to make a decision on behalf of the same sub-cluster by accessing and inquiring about authority information,
 wherein the notification unit is configured to transmit the lease relinquish message in response to the judging unit determining that the at least one of the plurality of nodes has authority.

11. A method for managing failover in a clustered system, the clustered system comprising a plurality of sub-clusters connected with one another by a first set of links, each sub-cluster comprising a plurality of nodes connected with one another by a second set of links, the method comprising:
 determining, by using at least one of the second set of links, that a suspect node within a same sub-cluster as another node has stopped;
 transmitting, in response to the determination, a lease relinquish message on behalf of the suspect node; and
 checking whether the another node has authority to make a decision on behalf of the same sub-cluster by accessing and inquiring about authority information,
 wherein transmitting a lease relinquish message comprises transmitting the lease relinquish message in response to the checking step determining that the another node has authority.

12. The method according to claim 11, wherein determining that a suspect node within a same sub-cluster has stopped comprises:
 monitoring nodes within the same sub-cluster so as to detect the suspect node; and
 ensuring the detected suspect node has stopped.

13. The method according to claim 12, wherein monitoring nodes within the same sub-cluster comprise monitoring nodes using heartbeat messages.

14. The method according to claim 12, wherein ensuring the suspect node has stopped comprises forcing the suspect node to stop using one or more of the second set of links.

15. The method according to claim 14, wherein the second set of links comprises tightly coupled links, and forcing the suspect node to stop comprises directly turning off a power supply of the suspect node using the tightly coupled links.

16. The method according to claim 12, wherein ensuring the suspect node has stopped comprises using the second set of links to detect a time when the suspect node is very likely to have stopped.

17. The method according to claim 11, wherein the lease relinquish message includes identification information of the suspect node.

18. The method according to claim 11, wherein transmitting a lease relinquish message comprises transmitting the lease relinquish message to a managing component which manages a lease of a global cluster.

* * * * *